United States Patent [19]
Wolf et al.

[11] Patent Number: 5,603,297
[45] Date of Patent: Feb. 18, 1997

[54] HEAT SHIELD

[75] Inventors: Jerry M. Wolf, Westerville; Hiten T. Shah, Delaware, both of Ohio

[73] Assignee: Acoust-A-Fiber Research and Development, Inc., Delaware, Ohio

[21] Appl. No.: 588,523

[22] Filed: Jan. 18, 1996

[51] Int. Cl.[6] .................................................. F02B 77/00
[52] U.S. Cl. ........................................................ 123/195 C
[58] Field of Search ............................. 123/198 E, 195 C

[56] References Cited

U.S. PATENT DOCUMENTS

| | | | |
|---|---|---|---|
| 4,562,895 | 1/1986 | Kirchweger | 123/198 E |
| 4,612,767 | 9/1986 | Engquist et al. | 60/321 |
| 4,878,467 | 11/1989 | Schmidt | 123/195 C |
| 4,928,980 | 5/1990 | Deuring | 123/198 E |
| 5,233,953 | 8/1993 | Whitehurst et al. | 123/198 E |

Primary Examiner—David A. Okonsky
Attorney, Agent, or Firm—Kremblas, Foster, Millard & Pollick; Sidney W. Millard

[57] ABSTRACT

A heat shield formed of composite layers of reflective metallic foil, heat insulating fibers and a non-electrically conducting sheet molding compound which are deformed to the general shape of an operating apparatus. The shield is then clamped about the operating apparatus in spaced relationship between the operating apparatus and a high temperature heat source to prevent heat radiation to the operating apparatus.

20 Claims, 2 Drawing Sheets

HEAT SHIELD

FIELD OF INVENTION

This invention relates to a shield to be mounted in an engine compartment between a hot body such as an exhaust manifold and operating apparatus in the compartment subject to premature deterioration from heat.

BACKGROUND OF THE INVENTION

High performance engines used in modern vehicles tend to operate at a higher temperature than internal combustion engines of several years ago. As a result the temperature of the exhaust manifold and other component parts rises to where the components may be "red hot". The problem is that operating apparatus within the engine compartment having rubber, plastic or other non-metal, non-steel components, may be subjected to radiant heat from the hot body and thereby prematurely deteriorate the desired operating parameters of the operating apparatus. Examples of operating apparatus which fall into this category are alternators, starter motors and turbo chargers.

There is a need to provide a heat shield or heat barrier between the hot body and the operating apparatus which is structured in a way to minimize heat build up in the operating apparatus as a result of radiant heat from the hot body.

A patent to Engquist et al., U.S. Pat. No. 4,612,767, discloses a heat shield mounted to an exhaust system designed to reflect heat back toward the exhaust system. The shield includes a plurality of spaced apart layers structured to facilitate a convective air flow to cool the spaced apart shield elements. The engine reaches steady state operating temperatures and over time the layered heat shield also reaches steady state operating temperatures which are obviously going to be below the operating temperature of the exhaust system which it encompasses. The degree of heat shielding by the apparatus illustrated in the patent is controlled in part by the temperature of the air flowing in the convection passages.

A patent to Schmidt, U.S. Pat. No. 4,878,467, discloses a protective heat cover for traction drives. The invention disclosed is of a closed body surrounding a traction drive which is cooled by air pumped from an outside system through the closed body. The intent is to cool by air pumped into the system rather than shielding outside operating components from the heat of radiation generated by the traction drive. Nevertheless, the structure illustrated inherently serves as a heat shield to operating components which might be in the vicinity of the hot traction drive. The emphasis in this patent is on heat transfer by induced air flow rather than shielding other components from radiation.

A patent to Deuring, U.S. Pat. No. 4,928,980, discloses a cover for motor vehicle crankcases and gear boxes. The cover inherently reduces radiation to other components not illustrated.

The most pertinent prior art appears to be a patent to Whitehurst, U.S. Pat. No. 5,233,953, which discloses a spring steel heat shield for snapping onto the periphery of a starter motor solenoid. The structure minimizes radiant heat directed toward the solenoid from an exhaust system. The problem is that the heat shield is spring steel itself and over a period of time at steady state operation the shield continues to rise in temperature and to a certain extent will defeat the intended purpose although it is certainly better than nothing.

The disclosed shield may well be effective in extending the life of the components of the starter motor which may be adversely affected by elevated temperatures.

There is a need in the industry for a heat shield to surround or partially encompass operating apparatus within a vehicle engine compartment which provides a rather substantial heat gradient across the shield between a high temperature heat source and the surface of the operating apparatus to be protected.

SUMMARY OF THE INVENTION

To accomplish this desired result, a layered composite shield is provided which has a substantial heat gradient between its outer surface and its inner surface and thereby greatly reduces the amount of radiant heat directed to the operating apparatus from the innermost surface of the heat shield. Radiant heat is exponentially proportional to the surface temperature of a body. Accordingly, this invention provides a curved surface to partially surround the body to be protected and by virtue of layered composite materials forming the shield insures that the surface of the innermost layer has a greatly reduced temperature as compared to the surface of the outer layer facing the red hot component.

The outermost layer of the shield is formed of embossed textured aluminum foil or stainless steel. The outermost layer is bonded to a fiber layer which in turn is bonded to a sheet molding compound formed of fibers and a high temperature thermosetting resin.

The heat shield is configured to be spaced from the surface of the operating apparatus to be shielded. This is achieved by providing a spacer which is bonded to the exterior surface a strap. The strap extends around the periphery of the body to be protected. The shield is attached to the spacer. Thus, an air gap is formed between the surface of the body to be protected and the fibrous mixture of sheet molding compound forming the inner layer of the shield. Thereby air is permitted to flow between the spaced apart surfaces to provide a cooling effect.

Objects of the invention not clear from the above description will be understood fully upon a review of the drawings and a description of the preferred embodiments which follow:

DESCRIPTION OF THE PREFERRED EMBODIMENTS

Figure 1:
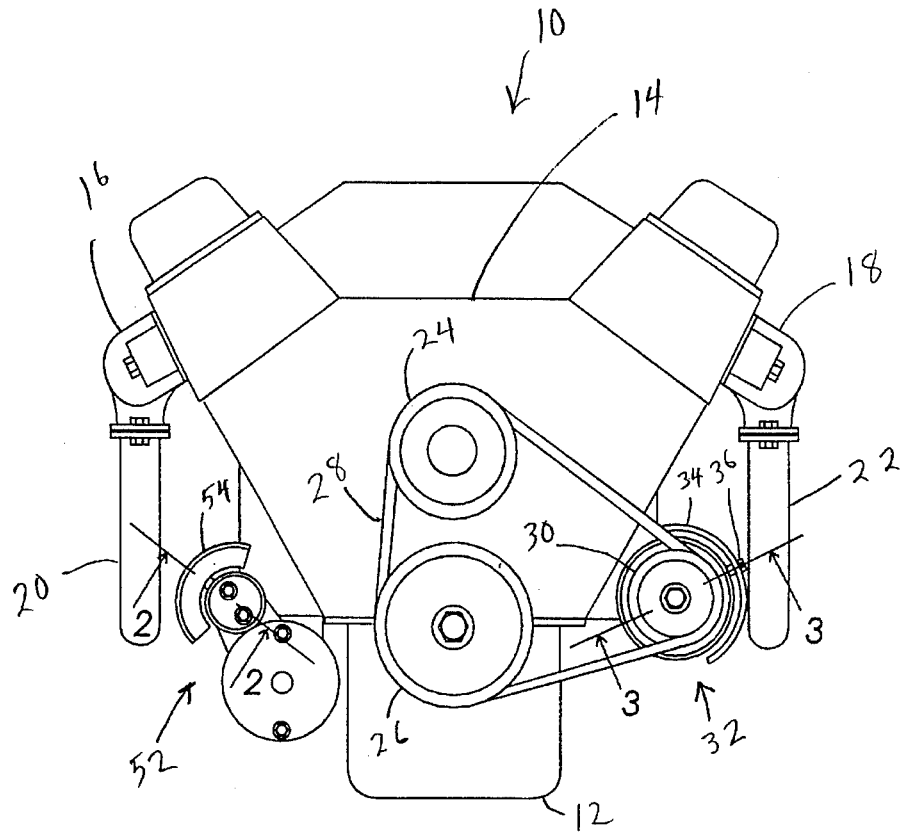
FIG. 1 is a front elevational view in schematic form showing an internal combustion engine with associated pulleys, exhaust system, alternator and starter motor.

Looking to FIG. 1, a V-shaped internal combustion engine 10 is shown from the front in somewhat schematic fashion to illustrate the environment in which the heat shield of this invention operates. The illustrated engine is of no particular significance as far as its configuration is concerned. But, for the record, it illustrates an oil pan 12 attached to the bottom of an engine block 14 and includes exhaust manifolds 16 and 18. Each exhaust manifold is attached to an exhaust pipe 20, 22 which may lead to a catalytic converter, a muffler, and ultimately to the atmosphere.

Projecting forwardly from the block 14 are traction drive pulleys 24 and 26 which drive a belt 28 in conventional fashion. Belt 28 extends around a pulley 30 at one end of an alternator 32.

Mounted radially of the alternator 32 and between the alternator and exhaust pipe 22 is a laminated heat shield 34 secured to the alternator by a threaded bolt 36.

Figure 3:
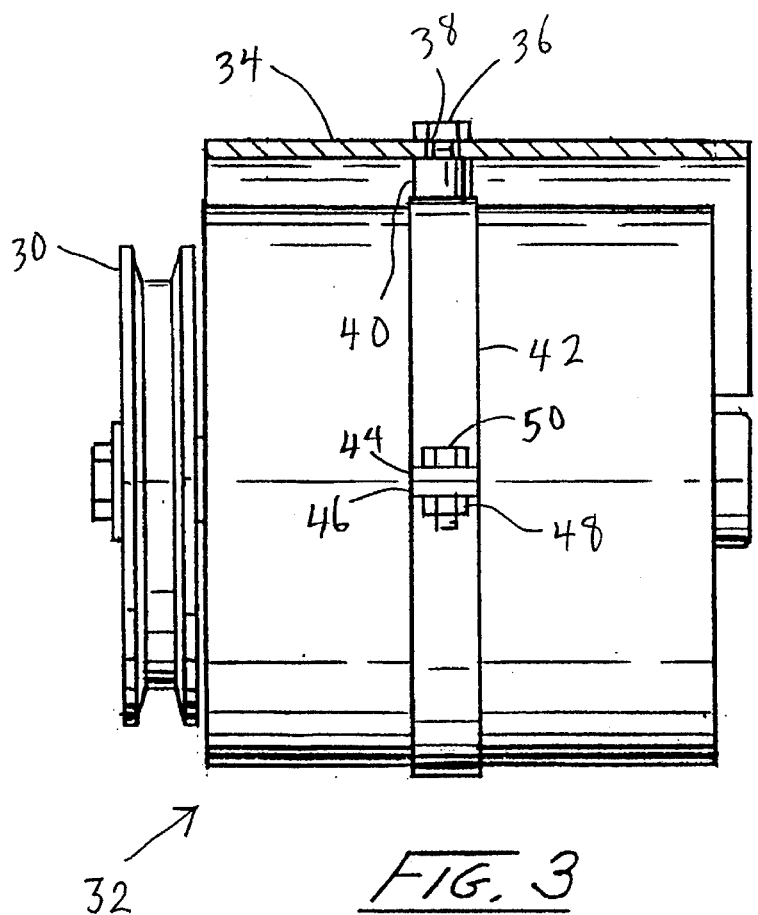
FIG. 3 is an elevational view of alternator with an associated shield according to this invention, partially in section taken along line 3—3 of FIG. 1.

As best seen in FIG. 3, bolt 36 projects through a hole 38 in shield 34 and threads into an internally threaded stand off boss, spacer or threaded washer 40 which is secured in turn by welding or other conventional means to a strap 42 which extends around the periphery of alternator 32. The ends 44 and 46 of strap 42 project radially from the alternator 32 to form flanges having mating apertures therethrough to accommodate a nut 48 and bolt 50 combination. Bolt 50 and nut 48 tightly secure the shield 34 in place, spaced radially outward of the alternator 32. The outer surface of the alternator and the inner surface of the shield are of the same general curved geometric shape with the shield having a larger radius. Thus, the shield serves as a barrier against direct thermal radiation from the surface of exhaust pipe 22 and manifold 18.

Figure 2:
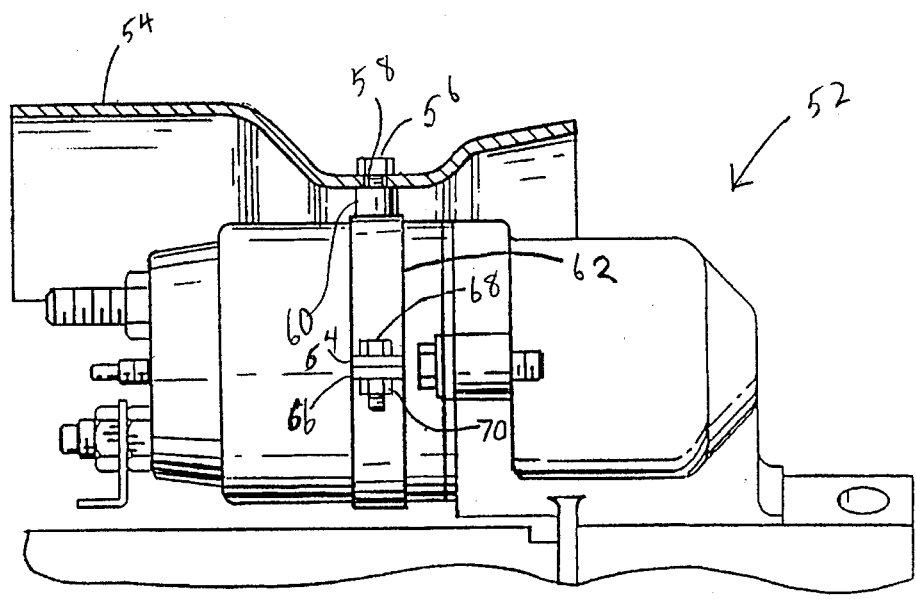
FIG. 2 is an elevational view, partially in section, of a starter motor and a shield according to this invention.

FIG. 2 illustrates a similar structure where a starter motor 52 is mounted in conventional fashion in proximity to the engine block 14. Mounted radially outward of the periphery of the starter motor 52 and between the starter motor and exhaust pipe 20 and exhaust manifold 16 is a composite layered heat shield 54. The particular illustrated flared ends of heat shield 54 are designed to enhance air flow through the path between the shield 54 and the periphery of the starter motor 52. The exact configuration may not be of significance from an inventive standpoint so long as the shield is mounted such that it shields the starter motor from direct radiation from the exhaust pipe 20 and exhaust manifold 16 as illustrated best in FIG. 1.

As with the mounting described in relation to the alternator in FIG. 3, the shield 54 in FIG. 2 is mounted radially outwardly of the periphery of the starter motor by a threaded bolt 56 extending through a hole 58 in shield 54 and threaded into an internally threaded boss or washer 60. The purpose of washer 60 is to space the shield from the periphery of the operating apparatus to be shielded, in this example, the alternator 52. Washer 60 is secured by welding or other conventional means to a strap 62 encircling starter motor 52 and having its flanged ends 64 and 66 clamped together by a threaded bolt 68 passing through mating openings to a threaded nut 70.

The shields 34 and 54 of this invention are formed for maximum heat shielding affect by a plurality of layers to provide a large heat gradient between the internal and external surfaces of the shields. It is well known in heat transfer technology that a large heat gradient exists across the boundary surfaces of layered materials. Layers composed of fibers are essentially a plurality of layers, depending upon the thickness of the multi-fiber layer. Accordingly, fibrous structures provide a relatively poor path for heat conduction. That is a desirable characteristic in the environment where the shield of this invention is mounted.

This invention provides a layered composite heat shield having a metallic reflective outer surface bonded to a fibrous layer by a thermosetting resin and in turn to an inner layer formed of a thermosetting resin and mixed with fibers of the same composition as the middle layer. The three layers are bonded together to provide a non-electrically conducting inner surface. One of the objects of the invention is to have the heat shield electrically insulated from the associated operating apparatus and this may be accomplished by providing an electrically non-conducting washer 40, 60. Alternatively, fibrous, electrically non-conducting, washers (not shown) may be inserted between the bolt heads and the metallic layer of the heat shield.

Figure 4:
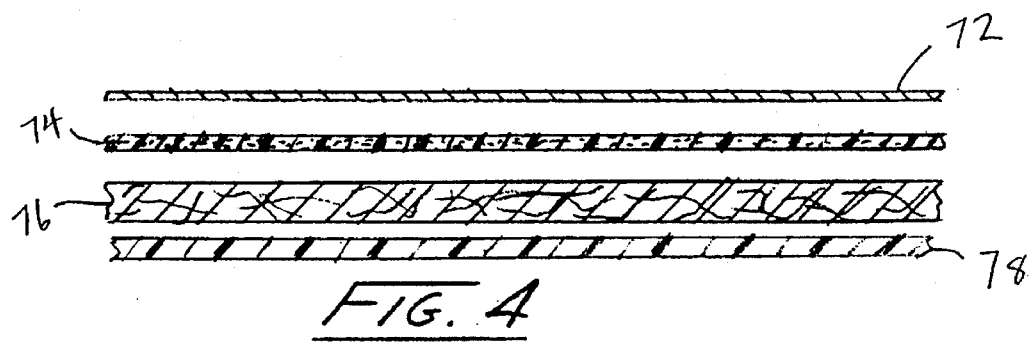
FIG. 4 is a fragmentary exploded sectional view of the layered parts of the shield of this invention prior to molding them into the composite heat shield invention.
Figure 5:
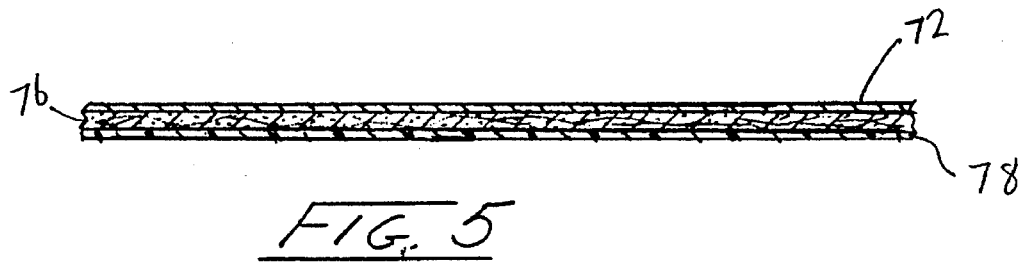
FIG. 5 is a fragmentary sectional view of the component parts of the laminated heat shield of this invention after the layers are molded together.

Looking now to FIGS. 4 and 5, the outer layer of the shield is a reflective metallic surface 72 which may be formed of embossed textured aluminum foil or stainless steel depending upon the temperature environment anticipated for use. Aluminum melts at a lower temperature than stainless steel.

In the exploded view of FIG. 4, prior to molding the layers together, the next inner layer 74 is a thermosetting adhesive, preferably a phenyl phenolic resin, which serves to bond metallic layer 72 to the next inner layer of fibers 76. The fibers of layer 76 may be of fiberglass, basalt, ceramic or mixtures thereof, depending upon the desired temperature upper limit. For example, the basalt mineral fibers preferred in most environments where this invention is used, have a melting point of about 1,700° F. Fiberglass has a much lower melting point and will not be suitable for all environments. Ceramic fibers are used in certain specialized areas where the temperature in normal operations exceeds 1,700° F.

Adhesive layer 74 may be illusionary in some composite structures. For example, with basalt mineral fibers, the fibrous bat supplied has about 3% phenyl phenolic resin incorporated therein. Thus, a separate layer of adhesive 74 is not required to achieve the desired bonding of layers.

It will be understood that the fibers have a lower conductivity than the resin bonding them together; accordingly, the lower the percentage of resin, the lower the heat transfer by conduction. The idea of the fiber layer 76 is to provide a large heat gradient across the shield.

The inner most layer of the molded shield is a sheet molding composite 78 which is a mixture of high temperature polyester resin and fibers of the same composition as the fibers in layer 76.

The layers illustrated in FIG. 4, are originally supplied in flat sheet form. Subsequently, they are laminated together under pressure and temperature and deformed into the desired shape such as the two shapes illustrated in FIGS. 2 and 3. Upon deformation, compression and heat, adhesive layer 74 (if it exists separately) melts into fibrous layer 76 and for all intents and purposes is visibly non-existent, but the resin does serve to bond the two layers together. Compression, heat, and deformation also serve to bond the uncured thermosetting resin layer 78 with the innermost surface of fiber layer 76 such that the final product is relatively rigid. The ultimate result is a reflective metallic surface from layer 72 which tends to reflect or reradiate heat radiated to the shield from the exhaust system 16, 20.

The thickness of fiber layer 76 may be from ⅛ of an inch to 1½ inches, depending upon needs. Fibrous layer 76 functions very effectively to minimize conduction between metallic layer 72 and sheet molding compound layer 78. Additionally, the two surface barriers where the bonding has taken place enhance the heat transfer - heat shielding effect.

The thickness of the metallic reflective layer 72 is very small, for example, four to eight mils, six mils is a preferred thickness.

In the preferred embodiment, in a conventional engine compartment the thickness of the composite layer of the shield is only be about ⅛ inch with layers 76 and 78 being about the same thickness, the thicknesses illustrated in FIGS. 4 and 5 are not to scale.

Having best described the invention in its preferred embodiments, modifications will be obvious to those having ordinary skill in the art. It is not intended that the invention be limited by the words used to describe the component parts nor the illustrated environment of the drawings. Rather, it is intended that the invention be limited only by the scope of the appended claims.

We claim:

1. A heat shield for mounting in an engine compartment between a hot body and operating apparatus comprising, said shield being mounted between said apparatus and said hot body by a strap encircling said apparatus, said shield being comprised of a plurality of layers of materials and shaped to partially surround said apparatus, said shield being attached to said strap and spaced from said apparatus to provide a cooling air space between said apparatus and said shield, said shield including a layer of metallic heat reflective material facing toward said hot body, said metallic material being bonded to a layer of fibers by a thermosetting resin, said fibers having a lower thermal conductivity than said resin to provide a large heat gradient between the surface of said metallic layer facing said hot body and the surface of said fiber layer closest to said apparatus.

2. The shield of claim 1 including an inner layer of non-electrically conducting sheet molding compound, said inner layer being a mixture of high temperature thermosetting resin and fibers, said fibers of said mixture being of the same physical composition as said layer of fibers, said inner layer being bonded to said layer of fibers to serve as an inner layer closest to said apparatus.

3. The shield of claim 2 wherein said fibers are selected from the group consisting of glass fibers, basalt mineral fibers, ceramic fibers and mixtures thereof.

4. The shield of claim 3 wherein said metallic layer is selected from the group consisting of textured aluminum and stainless steel.

5. The shield of claim 4 wherein said shield is secured to said strap by a bolt extending through a hole in said shield and threaded into a spacer mounted on the periphery of said strap.

6. The shield of claim 5 wherein said metallic layer has a thickness in the range of 4–8 mils and said fiber layer has a thickness in the range of ⅛ inch to 1½ inches.

7. The shield of claim 6 wherein said operating apparatus comprises one or more of a starter motor, a turbo-charger and an alternator.

8. The shield of claim 7 wherein said thermosetting resin bonding said metallic material to said fiber layer comprises a phenyl phenolic resin and the high temperature thermosetting resin in said inner layer comprises a polyester resin.

9. The shield of claim 1 wherein said fibers are selected from the group consisting of glass fibers, basalt mineral fibers, ceramic fibers and mixtures thereof.

10. The shield of claim 7 wherein said metallic layer is selected from the group consisting of textured aluminum and stainless steel.

11. The shield of claim 10 wherein said shield is secured to said strap by a bolt extending through a hole in said shield and threaded into a spacer mounted on the periphery of said strap.

12. The shield of claim 11 wherein said metallic layer has a thickness in the range of 4–8 mils and said fiber layer has a thickness in the range of ⅛ inch to 1½ inches.

13. The shield of claim 2 wherein said metallic layer is selected from the group consisting of textured aluminum and stainless steel.

14. The shield of claim 13 wherein said shield is secured to said strap by a bolt extending through a hole in said shield and threaded into a spacer mounted on the periphery of said strap.

15. The shield of claim 14 wherein said metallic layer has a thickness in the range of 4–8 mils and said fiber layer has a thickness in the range of ⅛ inch to 1½ inches.

16. The shield of claim 2 wherein said shield is secured to said strap by a bolt extending through a hole in said shield and threaded into a spacer mounted on the periphery of said strap.

17. The shield of claim 1 wherein said operating apparatus comprises one or more of a starter motor, a turbo-charger and an alternator.

18. The shield of claim 2 wherein said thermosetting resin bonding said metallic material comprises a phenyl phenolic resin the high temperature thermosetting resin in said inner layer comprises a polyester resin.

19. The shield of claim 1 wherein said metallic layer has a thickness in the range of 4–8 mils and said fiber layer has a thickness in the range of ⅛ inch to 1½ inches.

20. The shield of claim 1 wherein said shield is secured to said strap by a bolt extending through a hole in said shield and threaded into a spacer mounted on the periphery of said strap.

* * * * *